US011316756B2

(12) United States Patent
Mercian et al.

(10) Patent No.: US 11,316,756 B2
(45) Date of Patent: Apr. 26, 2022

(54) SELF-TUNING NETWORKS USING DISTRIBUTED ANALYTICS

(71) Applicant: Hewlett Packard Enterprise Development LP, Houston, TX (US)

(72) Inventors: Anu Mercian, Santa Clara, CA (US); David Rodrigues Pinheiro, Santa Clara, CA (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 117 days.

(21) Appl. No.: 16/537,411

(22) Filed: Aug. 9, 2019

(65) Prior Publication Data

US 2021/0044498 A1 Feb. 11, 2021

(51) Int. Cl.
*H04L 12/24* (2006.01)
*H04L 29/06* (2006.01)
(Continued)

(52) U.S. Cl.
CPC ........ *H04L 41/5025* (2013.01); *H04L 41/046* (2013.01); *H04L 41/5009* (2013.01); *H04L 63/1425* (2013.01)

(58) Field of Classification Search
CPC ............. H04L 41/5025; H04L 41/5009; H04L 63/1425; H04L 41/046; H04L 41/0843;
(Continued)

(56) References Cited

U.S. PATENT DOCUMENTS 7,974,211 B2 * 7/2011 Suriyanarayanan ........................ H04L 41/0869 370/252
8,019,838 B2 9/2011 Jiang et al.
(Continued)

OTHER PUBLICATIONS

Cisco, "Cisco Network Assurance Engine", available online at <https://web.archive.org/web/20180209212322/http://www.cisco.com/web/20180207195133/https://www.cisco.com/c/en/us/products/data-center-analytics/network-assurance-engine/index.html>, Feb. 7, 2018, 10 pages.
(Continued)

*Primary Examiner* — Joe Chacko
(74) *Attorney, Agent, or Firm* — Sheppard Mullin Richter & Hampton LLP

(57) ABSTRACT

Systems and methods are provided for self-tuning networks using distributed analytics for network devices. In some embodiments, the method includes instantiating, in a network device, an agent for a network protocol, wherein the agent: monitors a performance parameter for a resource of the network protocol, and responsive to a value of the performance parameter exceeding a threshold value, reports an anomaly for the network protocol to a remote management server, receives a new threshold value from the remote management server, the new threshold value being based on the anomaly reported by the network device, and anomalies reported by other network devices according to respective thresholds employed by the network devices for the performance parameter for the resource of the network protocol, and replaces the threshold value of the performance parameter for the resource of the network protocol with the new threshold value received from the remote management server.

20 Claims, 8 Drawing Sheets

(51) Int. Cl.
*H04L 41/5025* (2022.01)
*H04L 41/5009* (2022.01)
*H04L 41/046* (2022.01)

(58) Field of Classification Search
CPC . H04L 41/142; H04L 43/0817; H04L 43/065; H04L 43/16
See application file for complete search history.

(56) References Cited

U.S. PATENT DOCUMENTS

| | | | |
|---|---|---|---|
| 9,292,402 B2 * | 3/2016 | Mallige | G06F 11/3003 |
| 10,356,690 B2 * | 7/2019 | Liu | H04B 7/2606 |
| 10,373,072 B2 * | 8/2019 | Britton | G06N 20/00 |
| 2016/0094420 A1 | 3/2016 | Clemm et al. | |
| 2017/0134237 A1 * | 5/2017 | Yang | H04L 43/16 |
| 2017/0279847 A1 | 9/2017 | Dasgupta et al. | |

OTHER PUBLICATIONS

AppFormix Network Monitoring and Analytics with Streaming Telemetry, (Web Page), Retrieved Dec. 20, 2018, 5 Pgs.

Ciena Launches Cloud-Based Analytics Service, (Web Page), Oct. 30, 2018, Retrieved Dec. 20, 2018, 4 Pgs.

Kalmbach, P. et al., Empowering Self-Driving Networks, (Research Paper), Aug. 18, 2018, 7 Pgs.

* cited by examiner

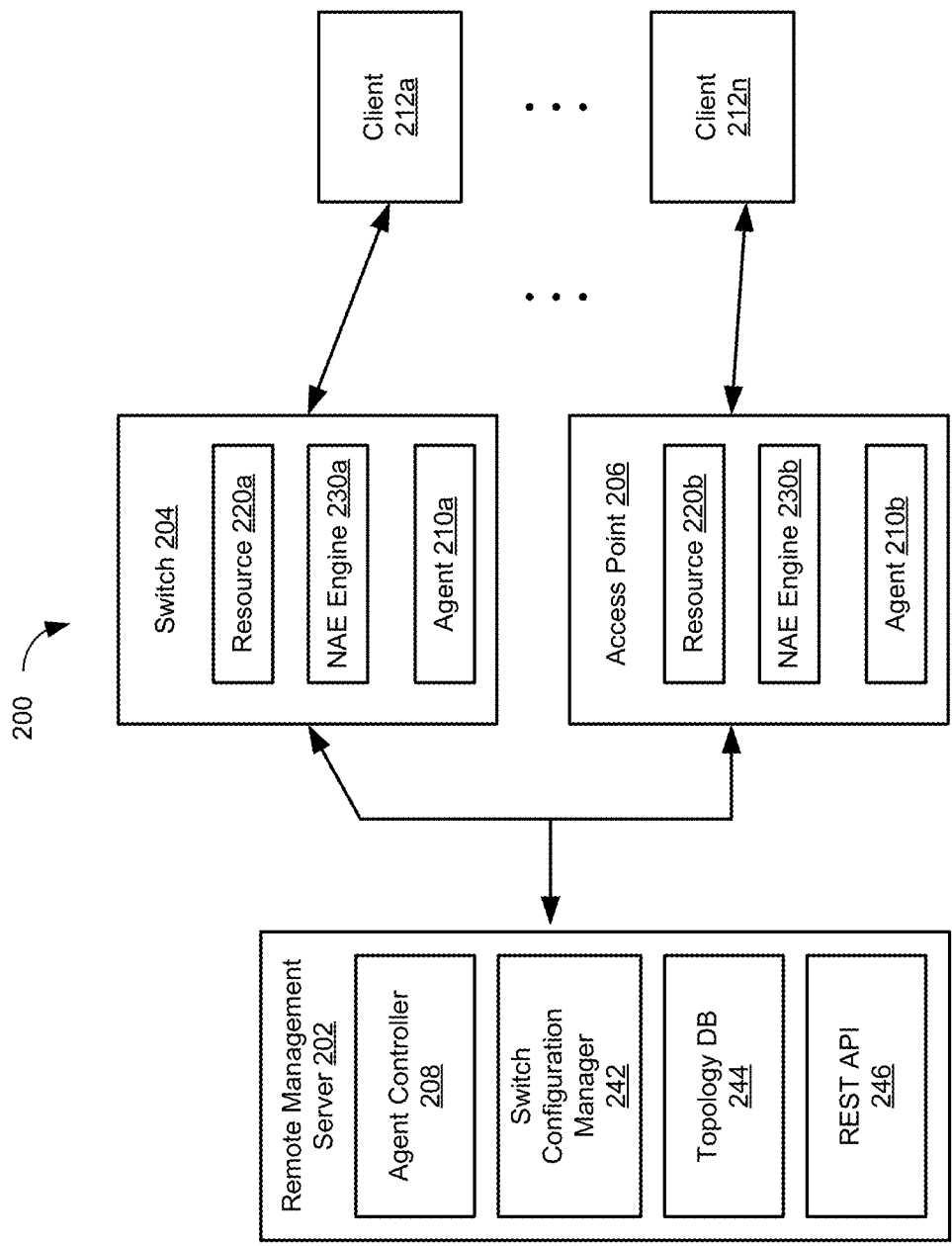

SELF-TUNING NETWORKS USING DISTRIBUTED ANALYTICS

DESCRIPTION OF RELATED ART

The disclosed technology relates generally to data communication networks, and more particularly some embodiments relate to managing network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 depicts a portion of a self-tuning network according to one embodiment of the disclosed technology.

The figures are not exhaustive and do not limit the present disclosure to the precise form disclosed.

DETAILED DESCRIPTION

Managing information technology (IT) in an enterprise or university campus is a difficult job, requiring expertise in various switch operating systems, data migration from wired switches to wireless access points, and the like. In addition, the recent burst of connectivity demands high manpower and fool-proof infrastructure to support network scalability and reliability. To alleviate these demands, much research and development has been conducted in the realm of network automation.

One significant problem with current network automation solutions is the high rate of false positive anomalies generated by current techniques. Acting on such false positives in a network unnecessarily degrades the performance of the network. Another problem is the lack of a single integrated network automation solution. Current solutions address only particular aspects of network automation. It is left to the enterprise IT professional to integrate these diverse solutions. This integration process is expensive and time consuming. And when integrating such diverse solutions it is difficult to avoid network instability, which can result in significant network outages.

Embodiments of the disclosed technology provide self-tuning networks using distributed analytics resulting in automated management for network devices including switches, access points, and the like. In this disclosure, networks employing this technology are sometimes referred to as "self-tuning networks." According to the disclosed technology, a respective monitoring agent may be instantiated in each network device for each network protocol configured in that network device. The agent may be a script that monitors one or more performance parameters for at least one resource of the respective network protocol. When a value of a performance parameter exceeds its threshold value, the agent takes a corrective action, which may include reporting an anomaly for the network protocol to a remote device management server, or repairing the resource. The remote device management server may generate a new threshold for the performance parameter of the network protocol resource. These thresholds may be generated according to techniques described in U.S. Pat. No. 7,974,211, entitled "Methods and apparatus for network configuration baselining and restoration," the disclosure thereof incorporated by reference herein in its entirety. The agent may receive a new threshold value that is based on the anomaly reported by the network device, and anomalies reported by other network devices. In this manner, the monitoring of network protocol resource performance, reporting of anomalies, and repair of the network may be automated and continuously tuned, providing improved monitoring and performance, and reduced reporting of false positive anomalies.

Figure 1:
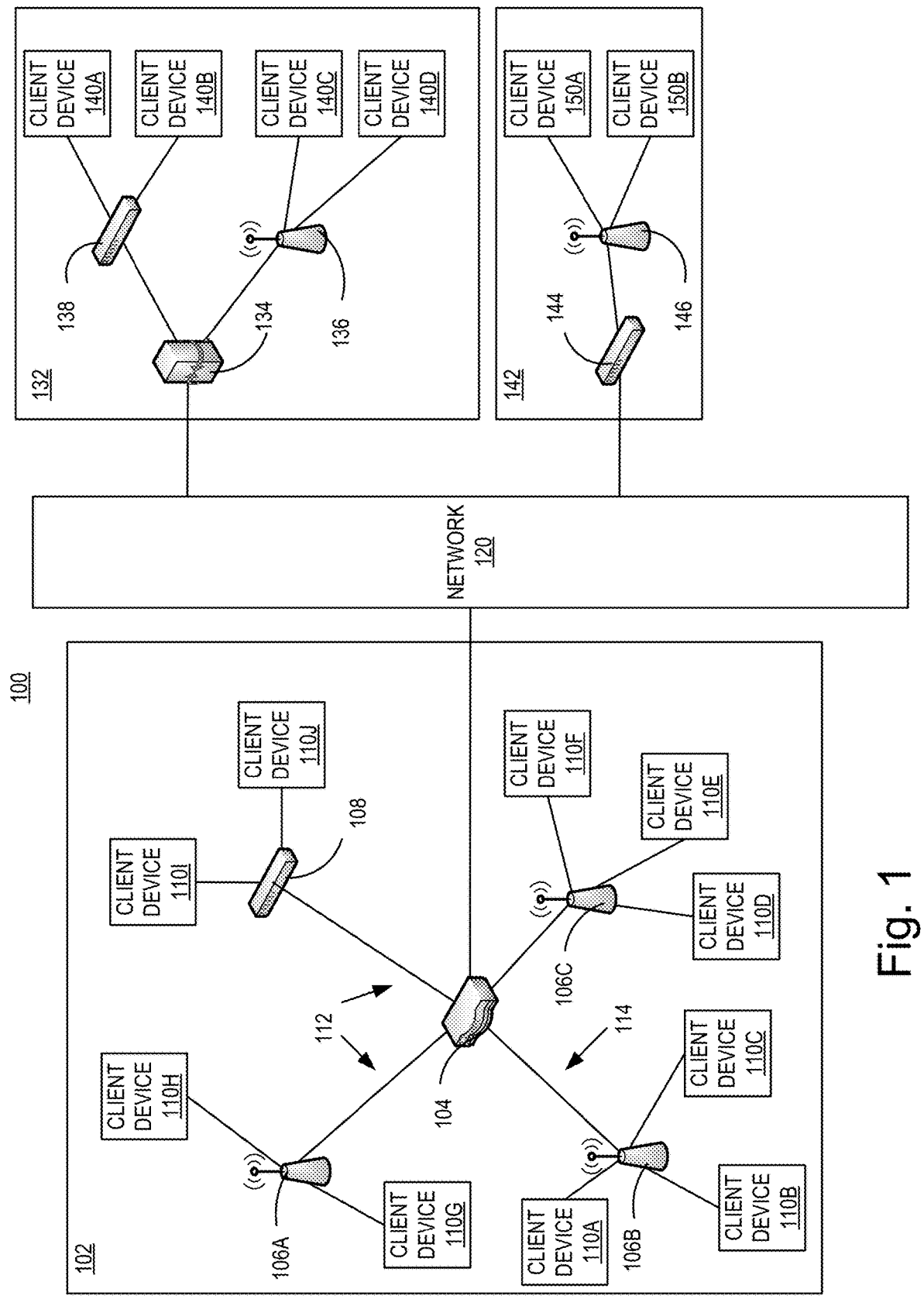
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless. While this example network deployment includes a controller 104, it will be appreciated that some embodiments of the disclosed technology may operate without such a controller, for example by employing a core aggregation switch.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces. Distributed self-tuning networks makes the most sense when the network deployment consists of devices such as wireless APs, edge access switches are included, because these devices do not have enough compute power to process self-tuning algorithms and the presence of more power switches and controllers in the core network, helps facilitate automation for self-tuning.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

FIG. 2 depicts a portion of a self-tuning network according to one embodiment of the disclosed technology. Referring to FIG. 2, the self-tuning network 200 may include a remote management server 202. The management server 202 is termed "remote" because it is generally located remotely from the network devices it manages. The remote management server 202 may be a local server, a cloud server, or the like. An agent controller 208, and a switch configuration manager 242, execute within the remote management server 202. The agent controller 208, and the switch configuration manager 242, may be implemented in hardware, software, or a combination thereof. While in the example embodiment of FIG. 2, the agent controller 208, and the switch configuration manager 242, are shown executing within a server 202, in other embodiments, the agent controller 208, and the switch configuration manager 242, may execute within other network devices. The remote management server 202 may include a topology database (DB) 244 to store topology information collected from the agents 210. The remote management server 202 may include a representational state transfer (REST) API 246 to facilitate communication with the agents 210.

The self-tuning network 200 may include a network switch 204. A network analytics engine (NAE) 230a may execute within the switch 204. The NAE 230a may be implemented in hardware, software, or a combination thereof. The switch 204 may provide one or more resources 220a of one or more network protocols. The example of FIG. 2 may be discussed in terms of specific protocols, for example including the border gateway protocol (BGP) and the open shortest path first (OSPF) routing protocol. However, it should be understood that this description can apply to many other network protocols as well depending on the use-case.

As a general description, the NAE 230a is a solution that automates network monitoring and troubleshooting. The NAE 230a can run within a switch operating system (OS), on supported computer platforms. Engineers can access the NAE through a web interface, and APIs can allow access to individual agents (which run in Linux containers) and to NAE databases. When a problem arises the agents of the NAE 230a can provide notifications to pertinent users, for example IT staff, network admins, and provide results of analysis. Some of the capabilities of the NAE 230a are supported through its database access. For instance, the NAE can access a database relating to configuration and states, which provides NAE agents with full access to configuration, protocol state, and network statistics (all fully exposed through the REST API 246). In another example, the NAE can access a database relating to time series data, which can contain relevant historical data correlated with configuration changes. In this case, the NAE 230a can access the database to provide operators with the ability to capture and archive the network context surrounding a network event.

The NAE 230a can provide faster time to root cause with its monitoring, data collection, and analytics capabilities. In an example of using the NAE 230a for root cause analysis, user problems can be mapped to root causes by automating common diagnostic routines that often lead directly to the exact problem. Using built-in monitors and data collection agents, the NAE 230a can predetermine many first and second order diagnostics, allowing network operators to focus on a smaller and more targeted set of root causes.

Additionally, agents of the NAE 230a can test for conditions and take actions based on the results the condition. An example of a condition might be a high hit count on an ACL, which would trigger an action to generate an alert and create a Syslog message or a custom report. A network operator can also use the NAE 230a to combine multiple actions into workflows to perform more selective diagnostics or recommendations. Besides providing the ability to monitor the status of a switch 204, the NAE 230a allows the agents, scripts, and alerts to be configured and viewed. The NAE 230a also has the capability to automatically generate graphs that enable additional context for troubleshooting networks.

The NAE 230a may be implemented in hardware and/or software which further configures hardware of the core switch 204 to execute the network analytics aspects and techniques for supporting multiple management interfaces, as disclosed. For example, the NAE 230a can program the core switch 204 to execute various actions that allow automated collection of data relating to network traffic through the switch 204 for providing network analytics. Further, the NAE 230a can be remotely managed, so as to allow a user, such as a network administrator, to adaptively configure the various network analytics related functions that are executed by the core switch 204. The core switch 204 can receive instructions, for example software scripts, which define one or more criteria used to govern network traffic monitoring at the core switch 204.

The NAE 230a may instantiate a respective agent 210a to monitor each resource 220a. The agents 210a may be implemented in hardware, software, or a combination thereof. The agents 210a may execute within the switch 204, and may communicate with the agent controller 208 executing within the remote management server 202.

The self-tuning network 200 may include an access point 206. A network analytics engine (NAE) 230b may execute within the access point 206. The NAE 230b may be implemented in hardware, software, or a combination thereof. The access point 206 may provide one or more resources 220b of one or more network protocols. The NAE 230b may instantiate a respective agent 210b to monitor each resource 220b. The agents 210b may be implemented in hardware, software, or a combination thereof. The agents 210b may execute within the access point 206, and may communicate with the agent controller 208 executing within the remote management server 202.

The self-tuning network 200 may include a plurality of client devices 212a-212n. The client devices 212 may be implemented as any sort of client devices, for example including smartphones, laptop computers, desktop computers, thin clients, Internet of Things (IoT) devices, and the like. The self-tuning network 200 may include other network devices as well. These network devices may include agents 210, agent controllers 208, or both.

Figure 3A:
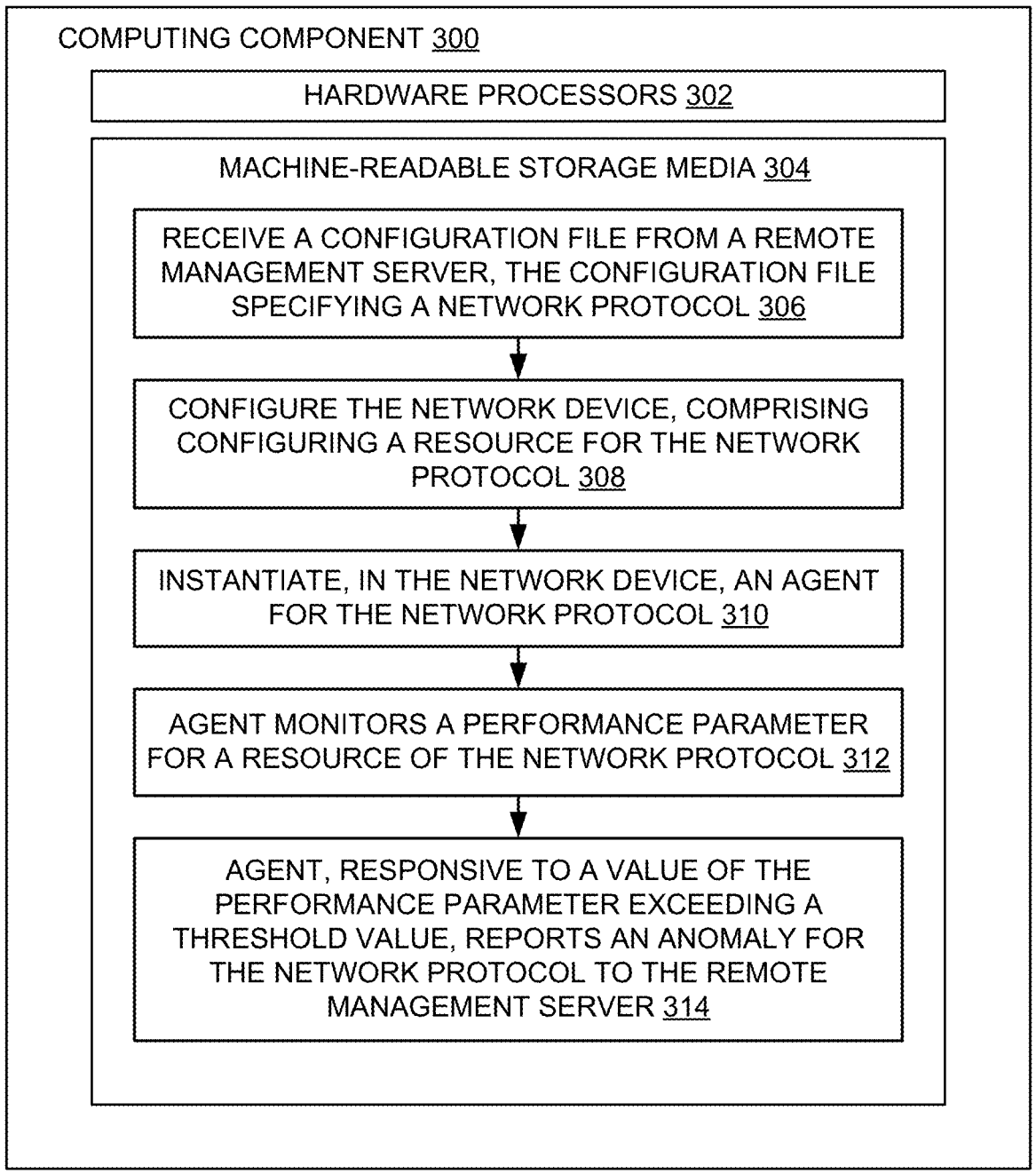
FIGS. 3A-3B are a block diagram of an example computing component or device for providing a self-tuning network in accordance with one embodiment.
Figure 3B:
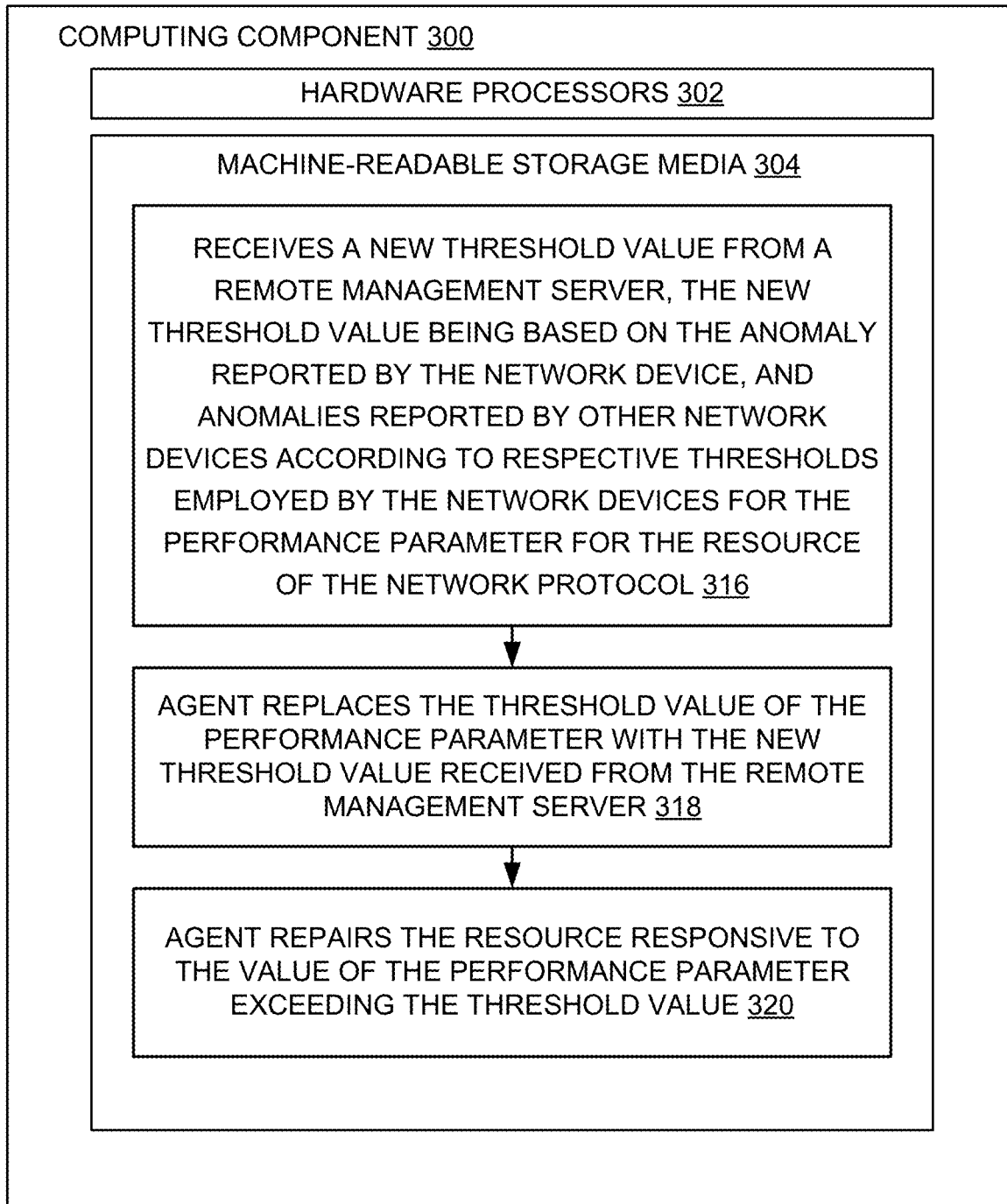

FIGS. 3A-3B are a block diagram of an example computing component or device 300 for providing a self-tuning network in accordance with one embodiment. Computing component 300 may be, for example, a server computer, a controller, or any other similar computing component capable of processing data. In the example implementation of FIG. 3, the computing component 300 includes a hardware processor 302, and machine-readable storage medium 304.

In some embodiments, computing component 300 may be an embodiment of an agent controller 208, a NAE 230, an agent 210, a network device such as a switch 204 or an access point 206, or any combination thereof.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-320, to control processes or operations for providing a self-tuning network. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-320.

Hardware processor 302 may execute instruction 306 for a network device to receive a configuration file from a remote management server, the configuration file specifying a network protocol. In the example of FIG. 2, the network device may be the switch 204 or the access point 206, and the configuration file may be provided by the switch configuration manager 242. Continuing the example of FIG. 2, the configuration file may specify the border gateway protocol, the OSPF protocol, other network protocols, or any combination thereof.

Hardware processor 302 may execute instruction 308 to configure a network device, comprising configuring a resource for the network protocol. Continuing the example of FIG. 2, the switch 204, and the access point 206, may configure the border gateway protocol or the OSPF protocol, Spanning Tree Protocol or the like (Any Layer 2-Layer 4 protocols).

Hardware processor 302 may execute instruction 310 to instantiate, in the network device, an agent for the network protocol. In the example of FIG. 2, the NAE 230a executing within the switch 204 may instantiate the agent 210a, and the NAE 230b executing within the access point 206 may instantiate the agent 210b. In some embodiments, a network device may instantiate an agent 210 by automatically generating, installing, and executing a script or the like.

The self-tuning technique revolves around automated monitoring, detecting, troubleshooting and correcting within a network device. With the help of distributed analytics, this can be done more effectively and efficiently because every device gets corrected when an anomaly is detected and every device can take immediate action because of the compute capability of the NAE. Without distributed analytics, most monitoring and troubleshooting is done centrally and incurs a lot of processing time and latency. When a network device such as switch, router or wireless AP is instantiated, it comes as a clean box with no configuration. The network admin configures multiple protocols and policies to enable connectivity for the network device in the deployment. In current technologies, the network admin begins with a basic configuration that is available, modifies the basic configuration for a specific network device, for example by modifying IP, subnets, and VLANs, and pushes the modified configuration to the device. Once connectivity is established, the device may be visible in a centralized management system, and basic monitoring techniques may be performed. When an issue occurs, large log files are examined, and connectivity tests are done, to identify the root-cause and solve the problem manually. This process leads to long hours of network downtime. In the disclosed Self-Tuning networks, the availability of a Network Analytics Engine (NAE) is leveraged on the network device. The NAE may identify the protocols and policies that are initially configured on the network device, and may instantiate appropriate monitoring for those protocols and policies. Therefore, the network admin gets a more detailed monitoring of the network device. In a complete self-tuned network deployment, when an anomaly occurs, the NAE agent automatically identifies the issue, modifies the configuration to recover from the anomaly, and pushes the modified configuration back to the network device. Multiple examples will be described below.

Hardware processor 302 may execute instruction 312 for the agent to monitor a performance parameter for a resource of the respective network protocol. In the example of FIG. 2, the agent 210a executing within the switch 204 may monitor the resource 220a, and the agent 210b executing within the access point 206 may monitor their resource 220b. For example, when the border gateway protocol is configured, the agents 210 may monitor a resource 220 of the border gateway protocol such as reachability and path changes. Network admins time and again quote how difficult monitoring route flapping has been in hybrid networks. With the help of distributed analytics, monitoring route flapping across a network deployment is easily achievable as described below in [0047]. As another example, when the open shortest path first (OSPF) routing protocol is configured, the agents 210 may monitor resources such as OSPF area mismatch, link-state advertisement (LSA) count, and shortest path factor (SPF) calculation. In particular, the agents 210 may monitor performance parameters for these resources. For example, for the LSA resource, the performance parameters may include the LSA count. As another example, for the SPF resource, the parameters may include the results of an SPF calculation.

Hardware processor 302 may execute instruction 314 for the agent, responsive to a value of the performance parameter exceeding a threshold value, to report an anomaly for the network protocol to the remote management server. Continuing the above examples, the LSA resource performance parameter may include a measured LSA count, and the threshold value for the LSA resource performance parameter may be a particular value for the LSA count. The SPF resource performance parameter may include the results of an SPF calculation, and the threshold value for the SPF resource performance parameter may be a particular value for the SPF calculation result. In the example of FIG. 2, the agent 210a may report an anomaly for the resource 220a, and the access point 206 may report an anomaly for the resource 220b. The agents 210 may report the value of the respective performance parameters to the remote management server 202 as well. In a similar way, when aggregating information across switches, continuing the example of the border gateway protocol, the anomaly may represent BGP route flapping or the like.

In some embodiments, the network devices may communicate with the remote management server via a discoverable application programming interface (API). For example, a discoverable API may be implemented as a representational state transfer (REST) API. The discoverable API may be generated by the network devices or by the remote management server. In the example of FIG. 2, the discoverable API may be generated by the remote management server 202, the switch 204, and the access point 206.

In response to the anomaly report, the remote management server 202 may take several actions. In some embodiments, the remote management server 202 may change the agents or the logic used to create the agents. For example, an agent may do more than simply monitor for a threshold crossing. An agent may compute features of the monitored data, for example such as rates, moving averages, and the like, and may monitor for threshold crossings of those computed values. An agent may combine or correlate multiple values, for example such as link congestion and routing peer status, to look for patterns that indicate network anomalies. The logic for computing these features and correlating values may be changed dynamically by the remote management server 202 in reaction to events or anomalies in the network. The agent logic for automatically remediating detected problems may also be dynamically changed by the remote management server 202.

Furthermore, the NAE engine 230 may enable agents, for example responsive to detecting configuration changes related to specific device features. Thus both the remote management server 202 and the device itself (for example the switch 204 or the access point 206) may enable agents, not only based on anomalies detected by other agents, but also by detecting configuration changes.

In some embodiments, the remote management server 202 may provide a new threshold to the agent in response to an anomaly report. Hardware processor 302 may execute instruction 316 for the agent to receive a new threshold value from the remote management server, the new threshold value being based on the anomaly reported by the network device, and anomalies reported by other network devices according to respective thresholds employed by the network devices for the performance parameter for the resource of the network protocol. In the example of FIG. 2, the agent controller 208 executing in the remote management server 202 may receive anomalies reported by numerous network devices, for numerous resources of numerous network protocols. The agent controller 208 may process multiple anomalies reported for a particular resource of a particular network protocol to generate a new monitoring threshold value for that resource, and may transmit that new monitoring threshold value to network devices monitoring that resource. The new monitoring threshold may be generated based upon current monitoring thresholds, values of network resource performance parameters reported by the network devices, and the like. In the example of FIG. 2, the agent controller 208 executing within the remote management server 202 may transmit new monitoring threshold values to the switch 204 and the access point 206. In some embodiments, the remote management server 202 may generate a new configuration file based on the reported anomalies, and may transmit the new configuration file to the affected network devices. In such embodiments, the configuration file may be processed as described above.

Hardware processor 302 may execute instruction 318 for the agent to replace the threshold value of the performance parameter for the resource of the network protocol with the new threshold value received from the remote management server. Continuing the example of FIG. 2, the agent 210a executing within the switch 204 may replace an existing threshold value for monitoring a performance parameter of the resource 220a with the new threshold value, and the agent 210b executing within the access point 206 may replace an existing threshold value for monitoring a performance parameter of the resource 220b with the new threshold value. The agents 210a,b subsequently monitor the respective resources 220a,b according to the new threshold value.

Hardware processor 302 may execute instruction 320 for the agent to repair the resource responsive to the value of the performance parameter exceeding the threshold value. In some embodiments, the agents 210 are capable of repairing some anomalies. In such embodiments, the agents 210 may generate new thresholds for monitoring resources 220 based on data collected by the agents 210. In the example of FIG. 2, the agent 210a executing within the switch 204 may repair the resource 220a by generating a new threshold value for monitoring that resource, and the agent 210b executing within the access point 206 may repair the resource 220b by generating a new threshold value for monitoring that resource 220b.

Figure 4:
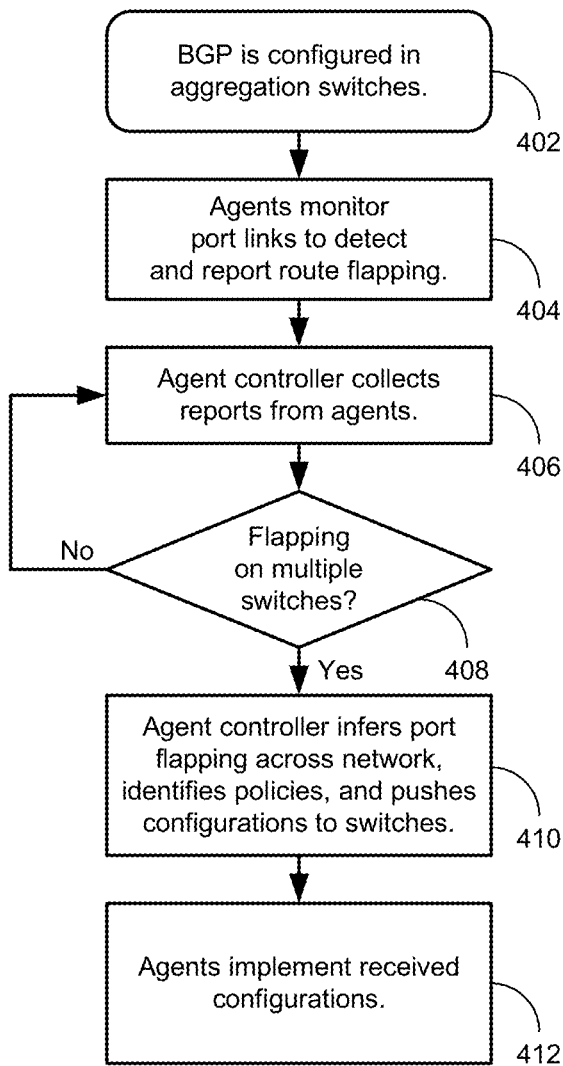
FIG. 4 illustrates an example operation of the disclosed technology to address border gateway protocol (BGP) route flapping in aggregation switches.

FIG. 4 illustrates an example operation of the disclosed technology to address border gateway protocol (BGP) route flapping in aggregation switches. Route flapping may occur when a network device advertises two conflicting network statuses quickly, alternately, and repeatedly. For example, the device may advertise a destination network via one route then another, or may advertise a destination network as unavailable, and then available. Consequently, route flapping prevents network convergence. Route flapping may be detected by monitoring port links, and remedied by applying a port flap dampening configuration, which increases the resilience and availability of the network by limiting the number of port state transitions on an interface. For example, if a port link state toggles from up to down for a specified number of times within a specified period, the interface is physically disabled for a specified wait period. Once the wait period expires, the port link state is re-enabled.

Referring to the example of FIG. 4, BGP is configured in various aggregation switches 204 in the network 200, at 402. Within each of the aggregation switches 204, an NAE agent 210 executes. Each agent 210 monitors port links in its aggregation switch 204 to detect link flapping, at 404. In particular, each agent 210 may, for each port, compare a state toggling rate to a threshold. When the rate exceeds the threshold, the agent 210 reports the anomaly to the agent controller 208.

The agent controller 208 collects the anomaly reports from the agents 210 in the switches 204, at 406. When the agent controller 210 receives reports of port flapping anomalies for multiple switches 204, at 408, the agent controller 210 infers port flapping across the network 200, and therefore identifies an appropriate port dampening policy for each switch 204, and pushes those policies as configurations to the respective switches 204, at 410. The switches 204 implement the received configurations, at 412, thereby remedying the port flapping anomaly.

Figure 5:
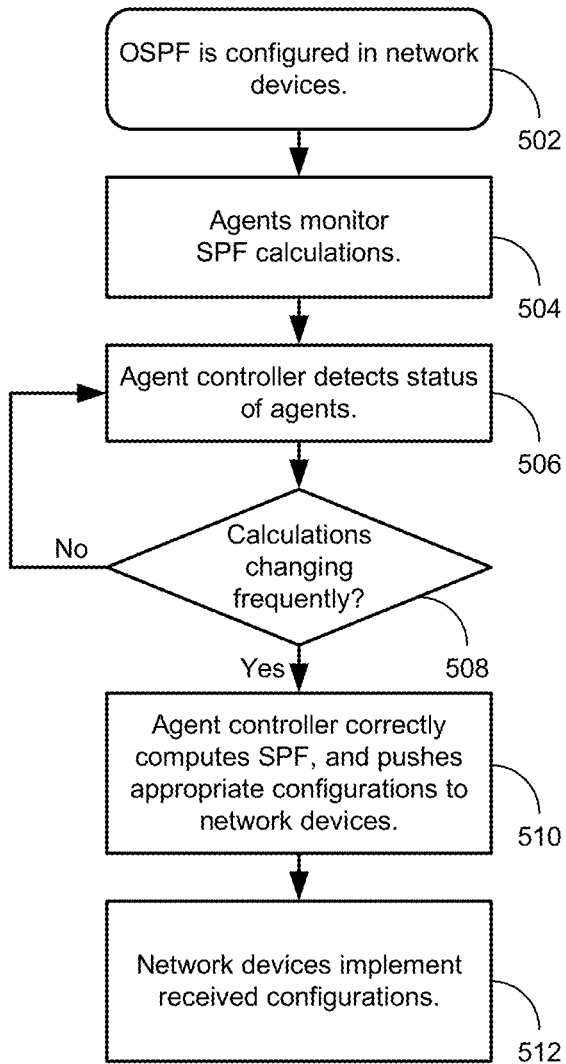
FIG. 5 illustrates an example operation of the disclosed technology to address excessive shortest path first (SPF) calculations under the open shortest path first (OSPF) routing protocol.

FIG. 5 illustrates an example operation of the disclosed technology to address excessive shortest path first (SPF) calculations under the open shortest path first (OSPF) routing protocol. Referring to the example of FIG. 5, OSPF is configured in various network devices 204 in the network 200, at 502. Within each of the devices 204, an NAE agent 210 executes. Each agent 210 monitors SPF calculations in its network device 204, at 504. Each network device 204 keeps a link state advertisement database that reflects its SPF calculations. Each NAE agent 210 monitors the database in its network device 204 to determine a rate of SPF calculations.

The agent controller 208 detects status of the agents 210, at 506. When the SPF calculations change frequently in one or more of the network devices, at 508, the agent controller 208 accesses the databases to correctly compute the SPF, and then update the anomalous network devices 204 with appropriate configurations, at 510. The network devices 204 implement the received configurations, thereby remedying the anomaly.

Figure 6:
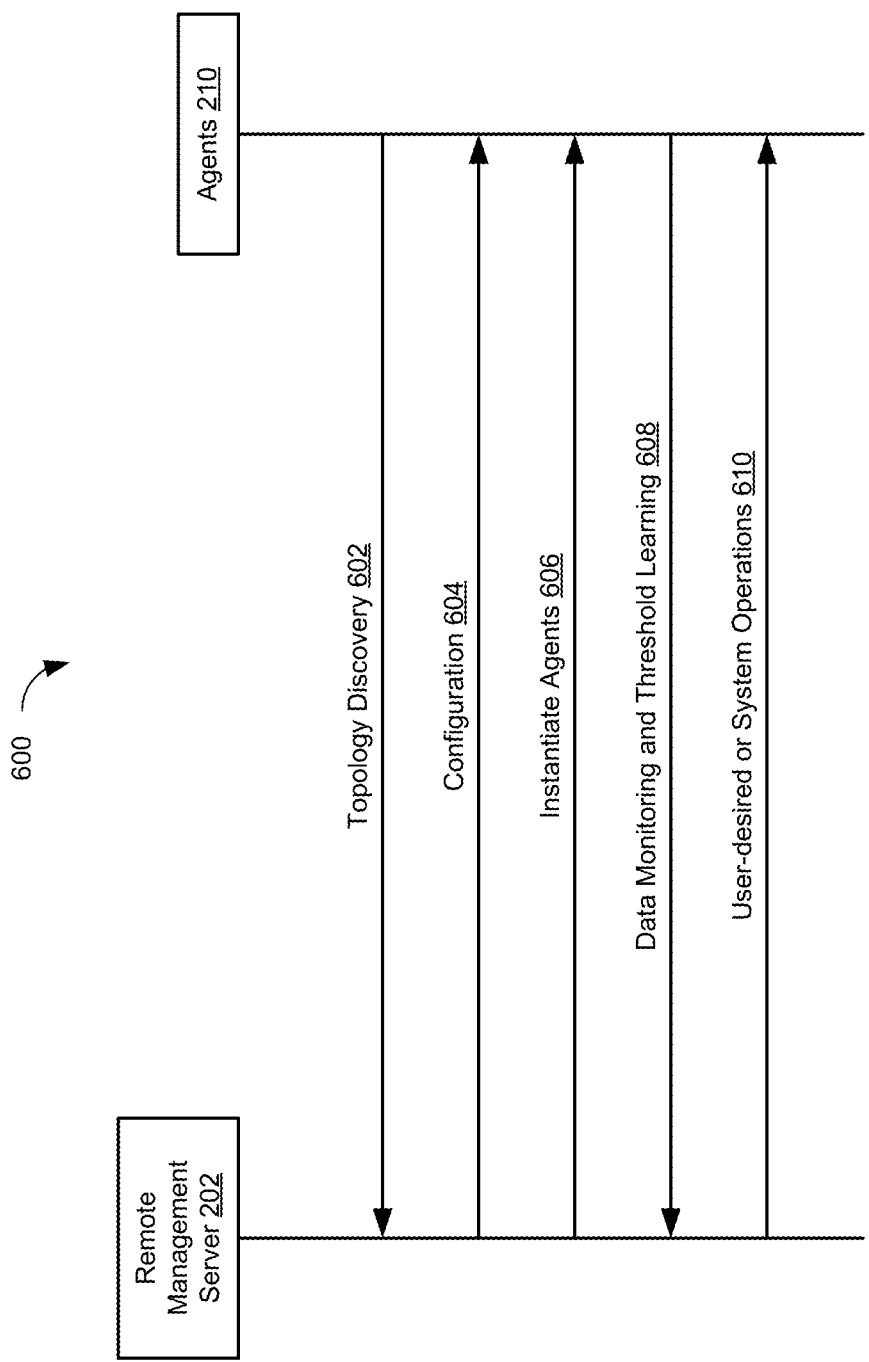
FIG. 6 illustrates an example process for the self-tuning network of FIG. 2 according to embodiments of the disclosed technology.

FIG. 6 illustrates an example process 600 for the self-tuning network 200 of FIG. 2 according to embodiments of the disclosed technology. Referring to FIG. 6, the self-tuning network 200 may perform topology discovery, at 602. For example, network topology information may be transferred from the network devices, such as the switch 204 and the access point 206, to the remote management server 202. The remote management server 202 may store the topology in its topology database 244.

The switch configuration manager 242 of the remote management server 202 may provide configurations to the network devices, at 604. The configurations may include any protocol. For example, the configurations may include the open shortest path first (OSPF) routing protocol.

The remote management server 202 may instantiate the agents 210 within the network devices, at 606. In the example of FIG. 2, the remote management server 202 may instantiate an agent 210a within the switch 204, and an agent 210b within the access point 206. The agents 210 then perform data monitoring, baseline learning, and the like, for example as described above. The agents 210 may report this information, and any anomalies detected, to the agent controller 208 executing within the remote management server 202, at 608.

Based on the information and anomalies reported by the agents, the remote management server 202 may take one or more user-desired or system operations, for example as described above, at 610. This process repeats, with new topology discovery and new configuration performed as needed.

Figure 7:
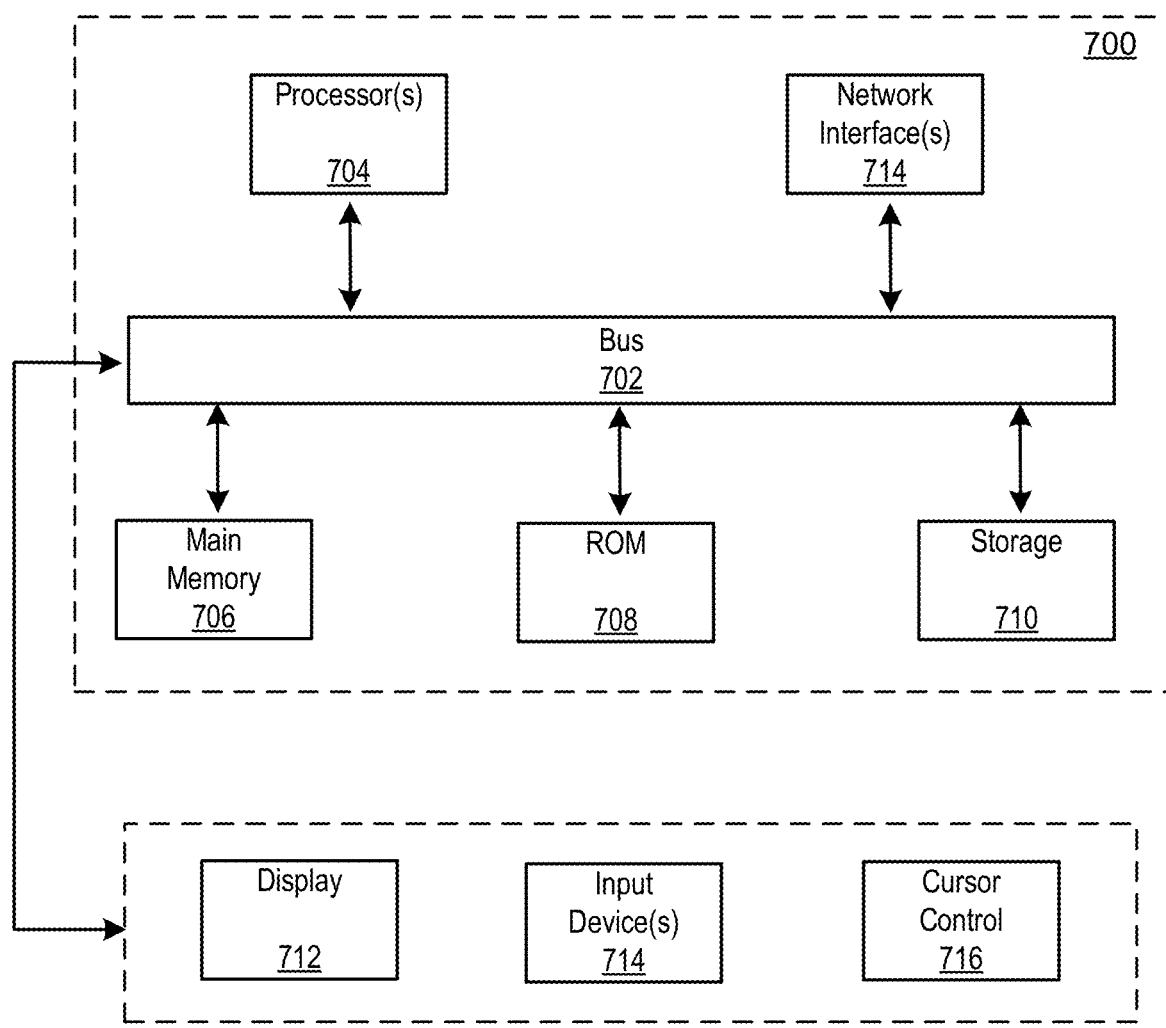
FIG. 7 depicts a block diagram of an example computer system in which embodiments described herein may be implemented.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 718, which carry the digital data to and from computer system 700, are example forms of transmission media.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to perform a method for a network device, the method comprising:
      monitoring, by an agent for a network protocol, a performance parameter for a resource of the network protocol at the network device;
      in response to a value of the performance parameter exceeding a threshold value, reporting, by the agent, an anomaly for the network protocol to a remote management server;
      receiving, by the agent, a new threshold value from the remote management server, wherein the new threshold value is based on the anomaly reported by the network device and corresponding anomalies reported by other network devices; and
      replacing, by the agent, the threshold value of the performance parameter for the resource of the network protocol with the new threshold value, thereby mitigating false positives associated with the anomaly for the network protocol.

2. The system of claim 1, wherein the method further comprises:
   repairing, by the agent, the resource in response to the value of the performance parameter exceeding the threshold value.

3. The system of claim 1, wherein the method further comprises:
   providing a discoverable application programming interface (API) to the agent;
   wherein the agent reports the anomaly for the network protocol to the remote management server via the discoverable API.

4. The system of claim 3,
   wherein the agent receives the new threshold value via the discoverable API.

5. The system of claim 1, wherein the method further comprises:
   receiving a configuration file from the remote management server, wherein the configuration file is associated with the network protocol; and
   configuring the resource for the network protocol based on the configuration file.

6. The system of claim 1, wherein the method further comprises:
   receiving a configuration file from the remote management server, wherein the configuration file is based on the anomaly reported by the network device and the corresponding anomalies reported by the other network devices; and configuring the network device according to the configuration file.

7. The system of claim 1, wherein reporting the anomaly further comprises:
reporting, by the agent, the value of the performance parameter to the remote management server;
wherein the new threshold value is determined based on the value of the performance parameter.

8. A non-transitory machine-readable storage medium encoded with instructions executable by a hardware processor of a computing component, the machine-readable storage medium comprising instructions to cause the hardware processor to perform a method for a network device, the method comprising:
monitoring, by an agent for a network protocol, a performance parameter for a resource of the network protocol at the network device;
in response to a value of the performance parameter exceeding a threshold value, reporting, by the agent, an anomaly for the network protocol to a remote management server;
receiving, by the agent, a new threshold value from the remote management server, wherein the new threshold value is based on the anomaly reported by the network device and corresponding anomalies reported by other network devices; and
replacing, by the agent, the threshold value of the performance parameter for the resource of the network protocol with the new threshold value, thereby mitigating false positives associated with the anomaly for the network protocol.

9. The medium of claim 8, wherein the method further comprises:
repairing, by the agent, the resource in response to the value of the performance parameter exceeding the threshold value.

10. The medium of claim 8, wherein the method further comprises:
providing a discoverable application programming interface (API) to the agent;
wherein the agent reports the anomaly for the network protocol to the remote management server via the discoverable API.

11. The medium of claim 10,
wherein the agent receives the new threshold value via the discoverable API.

12. The medium of claim 8, wherein the method further comprises:
receiving a configuration file from the remote management server, wherein the configuration file is associated with the network protocol; and
configuring the resource for the network protocol based on the configuration file.

13. The medium of claim 8, wherein the method further comprises:
receiving a configuration file from the remote management server, wherein the configuration file is based on the anomaly reported by the network device and the corresponding anomalies reported by the other network devices; and
configuring the network device according to the configuration file.

14. The medium of claim 8, wherein reporting the anomaly further comprises:
reporting, by the agent, the value of the performance parameter to the remote management server; and
wherein the new threshold value received is determined based on the value of the performance parameter.

15. A method for a network device, the method comprising:
monitoring, by an agent for a network protocol, a performance parameter for a resource of the network protocol at the network device;
in response to a value of the performance parameter exceeding a threshold value, reporting, by the agent, an anomaly for the network protocol to a remote management server,
receiving, by the agent, a new threshold value from the remote management server, wherein the new threshold value is based on the anomaly reported by the network device and corresponding anomalies reported by other network devices; and
replacing, by the agent, the threshold value of the performance parameter for the resource of the network protocol with the new threshold value, thereby mitigating false positives associated with the anomaly for the network protocol.

16. The method of claim 15, further comprising
repairing, by the agent, the resource in response to the value of the performance parameter exceeding the threshold value.

17. The method of claim 15, further comprising:
providing a discoverable application programming interface (API) to the agent;
wherein the agent reports the anomaly for the network protocol to the remote management server via the discoverable API; and
wherein the agent receives the new threshold value via the discoverable API.

18. The method of claim 15, wherein reporting the anomaly further comprises:
reporting, by the agent, the value of the performance parameter to the remote management server; and
wherein the new threshold value is determined based on the value of the performance parameter.

19. The method of claim 15, further comprising:
receiving a configuration file from the remote management server, wherein the configuration file is associated with the network protocol; and
configuring the resource for the network protocol based on the configuration file.

20. The method of claim 19, further comprising:
receiving a configuration file from the remote management server, wherein the configuration file is based on the anomaly reported by the network device and the corresponding anomalies reported by the other network devices; and
configuring the network device according to the configuration file.

* * * * *